United States Patent [19]

Bierl James F. et al.

[11] Patent Number: 5,042,590
[45] Date of Patent: Aug. 27, 1991

[54] TAPERED C-SPRING FOR A DISK HARROW

[75] Inventors: Bierl James F., West Des Moines; Warren L. Thompson; Terry L. Lowe, both of Ankeny; Mark W. Porter, Bondurant, all of Iowa

[73] Assignee: Deere & Company, Moline, Ill.

[21] Appl. No.: 585,770

[22] Filed: Sep. 20, 1990

[51] Int. Cl.⁵ ............................................. A01B 23/00
[52] U.S. Cl. .................................. 172/572; 172/708; 267/158
[58] Field of Search ............... 172/570, 572, 707, 708, 172/711, 705; 267/47, 158, 164

[56] References Cited

U.S. PATENT DOCUMENTS

| | | | |
|---|---|---|---|
| 457,095 | 8/1891 | Strait | 172/707 X |
| 3,640,348 | 2/1972 | Womble | 172/572 |
| 4,066,132 | 1/1978 | Rehn | 172/711 X |
| 4,333,535 | 6/1982 | Hentrich, Jr. | 172/572 |
| 4,407,372 | 10/1983 | Rozeboom | 172/572 |
| 4,683,958 | 8/1987 | Malinowski et al. | 172/708 X |
| 4,724,910 | 2/1988 | Wheeler | 172/572 |

FOREIGN PATENT DOCUMENTS 445451  11/1912  France .................................. 172/708

OTHER PUBLICATIONS

Landoll Model 875 Sales Brochure, Landoll Corporation, Sep.-1989.
Sunflower Model H Disc Sales Brochure, Sunflower Mfg., Jan. 1981.
King Double Offset Harrow Sales Brochure, King Plow Co., Jan. 1981.
Milfarm Mfg. Corporation, "Miller Series V" Sales Brochure.
Bush Hog Brochure "Flex-Wing Tandem Disc Harrows".
Krause 4900 Disc Harrow Brochure.

*Primary Examiner*—Dennis L. Taylor
*Assistant Examiner*—Jeffrey L. Thompson

[57] ABSTRACT

An improved disk harrow C-spring with a tapered cross section which reduces the compressive stresses in the inside radius and improves vertical and side-to-side flexibility. The curved portion of the C-spring has a constant cross section at the top and around three-fourths of the bend. At a location on the bend 45 degrees down from the horizontal, the thickness tapers to a location forward of the bearing hanger. The cross section is constant from the end of the taper to the end of the spring. The tapered cross section allows a thicker section to be used on the most highly stressed areas in the upper quadrant of the curved portion of the C-spring. The lower quadrant taper results in uniform stress distribution along the entire C-spring with the maximum compressive stress on the inside radius reduced substantially over a conventional C-spring. In addition, the tapered design provides an increase in both vertical and side-to-side flexibility for improved operation in rocky soil.

18 Claims, 2 Drawing Sheets

TAPERED C-SPRING FOR A DISK HARROW

BACKGROUND OF THE INVENTION

1) Field of the Invention

The present invention relates generally to implements such as disk harrows, and more specifically to an improved cushion standard for such implements.

2) Related Art:

Disk harrows include gangs of disk blades supported for rotation by bearings mounted on bearing hangers or standards which extend downwardly from the frame of the disk. Severe loads encountered in rough and rocky soil conditions often cause premature failure of disk blades, blade spacer spools, gang bolts and bearings. To reduce breakage, various types of cushioning devices have been made available which permit disk gang movement relative to the frame. A typical cushioning device such as a C-spring bearing hanger facilitates both vertical and some transverse gang movement for movement over and around obstacles such as rocks. Although the C-spring hangers afford some measure of gang protection, abbreviated fatigue life and limited flexibility of such hangers have heretofore continued to be problematic. Increasing the cross-section of the C-spring increases the fatigue life of the spring but results in a stiffer spring which transfers more destructive loading to the disk gang assembly. Some disk harrows are fitted with mechanical stops, or with helper springs such as shown in U.S. Pat. No. 4,407,372, to improve C-spring life, but these devices also cause more damaging loads to be transferred to the disk gang assembly. Other types of cushioning arrangements, such as the spring device illustrated in U.S. Pat. No. 4,333,535 reliably prevent disk gang assembly damage but have the disadvantage of being expensive to manufacture and assemble.

Various attempts have been made in the past to fabricate C-springs with non-uniform or tapered cross-sections to improve flexibility while maintaining good fatigue life. However, previously available tapered C-springs have experienced a less than desirable combination of flexibility and service life, particularly in rocky conditions present in many locations where the use of disk harrows is popular. Reasons for the lack of success of the tapered C-springs apparently include the lack of understanding of the stress distribution and failure pattern in the springs and the use of tapered sections that were originally designed for chisel plow shanks wherein the start of the taper is located at or near the start of the top bend radius on the upper portion of the C-spring. Previously, stress was measured on the outside of the radius of the C-spring, and it was assumed that the middle or forwardmost nose of the C-spring received the highest stresses. A uniform stress distribution along the entire C-spring was generally not achieved, and early breakage due to fatigue in the upper forward quadrant of the C-spring was common.

BRIEF SUMMARY OF THE INVENTION

It is therefore an object of the present invention to provide an improved cushion standard for an implement such as a disk harrow. It is another object to provide such a standard which has improved fatigue life and flexibility, and affords more disk gang protection than at least most previously available standards.

It is a further object of the present invention to provide an improved C-spring cushion standard having a more uniform stress distribution than most previously available C-spring devices. It is another object to provide such a standard with a tapered cross-section that increases flexibility and fatigue life.

It is a still another object to provide an improved C-spring standard having a cross-section which significantly reduces maximum stresses in the standard while still achieving a good spring rate. It is a further object to provide such a standard having a taper shape optimized by the use of finite element analysis techniques for the field loads experienced in rocky field conditions.

In accordance with the above objects, a non-uniform cross-section C-spring is designed using finite element method analysis (FEM) to optimize shape for a desired combination of flexibility and fatigue life. Using FEM analysis revealed that maximum stresses were compressive stresses on the inner radius of the C-spring, rather than tensile stresses on the outer radius as had been assumed in the past. The actual failure mode of most C-springs, as predicted by the FEM analysis and confirmed by actual field tests, initiates and fatigues from the inner radius due to compressive strains in that area. The compressive strains are a result of the combination of vertical and torsional loads experienced by the C-spring in rocky conditions. The failure mode is present when normal manufacturing processes are observed and the C-spring surfaces are properly prepared.

Based on the FEM analysis and field test results, a design goal was established for an improved C-spring with a tapered cross section which provided the same deflection as a current production C-spring (in this case, a 1.25×2 inch constant section C-spring) but with the maximum compressive stress in the inside radius reduced by approximately 20 per cent as compared with the production C-spring. The resulting spring has a 1.5×2 inch cross section at the top and around three-fourths of the bend. At a location on the bend 45 degrees down from the horizontal, a taper of approximately 0.0552 per inch begins. The taper ends in a cross section of 1×2 inches at a location just forward of the bearing hanger, and the cross section remains a constant 1×2 inches from the end of the taper to the end of the spring.

The tapered cross section allows a thicker section to be used on the most highly stressed areas in the upper quadrant of the curved portion of the C-spring. The lower quadrant taper results in uniform stress distribution along the entire C-spring with the maximum compressive stress on the inside radius reduced by approximately 20 per cent over the conventional base spring. In addition, the tapered design provides an increase in both vertical and side-to-side flexibility over that of the more highly stressed conventional production spring. As a result, the standard has improved fatigue life and flexibility, and affords more disk gang protection than at least most previously available standards. The gang can more easily move both up and around obstacles with the tapered spring, and disk gang assembly life and performance in severe rock conditions are significantly improved.

These and other objects, features and advantages of the present invention will become apparent to one skilled in the art upon reading the following detailed description in view of the drawings.

DETAILED DESCRIPTION OF THE DRAWINGS

Figure 1:
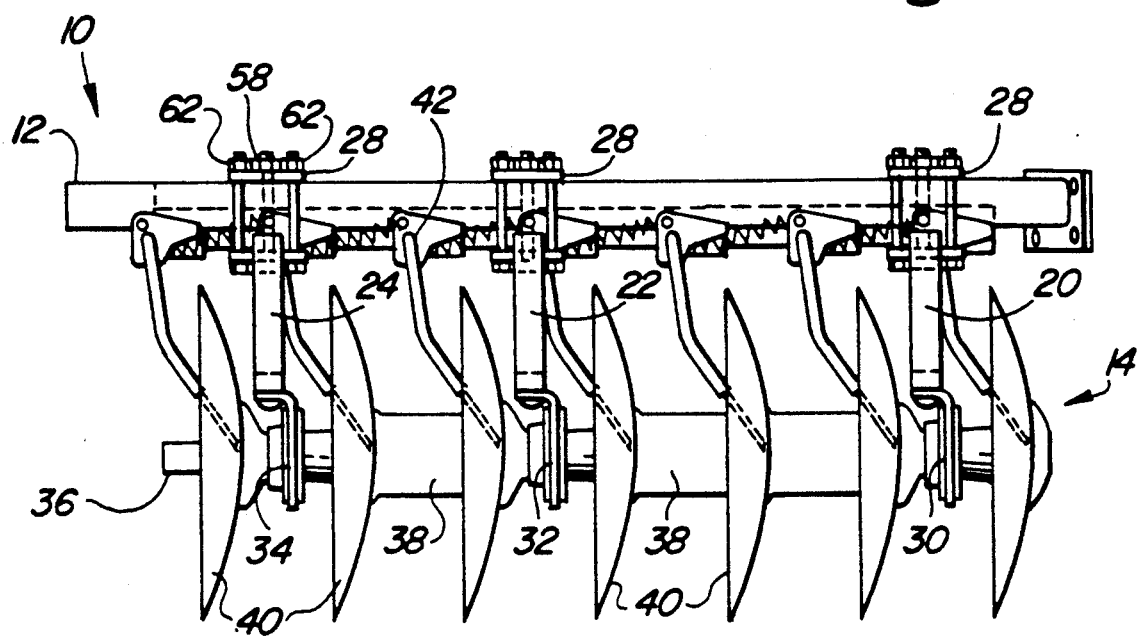
FIG. 1 is a front view of a portion of a disk harrow including a disk gang assembly with C-spring standards.

Referring now to FIG. 1, therein is shown a portion of a disk harrow 10 having a gang frame 12 supported by a frame for forward movement over the ground by lift wheel assemblies (not shown). A disk gang assembly 14 is supported from the frame 12. The assembly 14 includes C-spring standards or bearing hangers 20, 22 and 24 connected by brackets 28 to the frame 12. Bearings 30, 32 and 34 connected to the lower ends of the respective standards 20, 22 and 24 rotatably support a conventional arrangement including a gang bolt 36 with spools 38 and disk blades 40. A plurality of scrapers 42 are supported from a small transverse tubular beam 44 (FIG. 2) carried rearwardly of the brackets 28 by a bracket extension 48.

Figure 2:
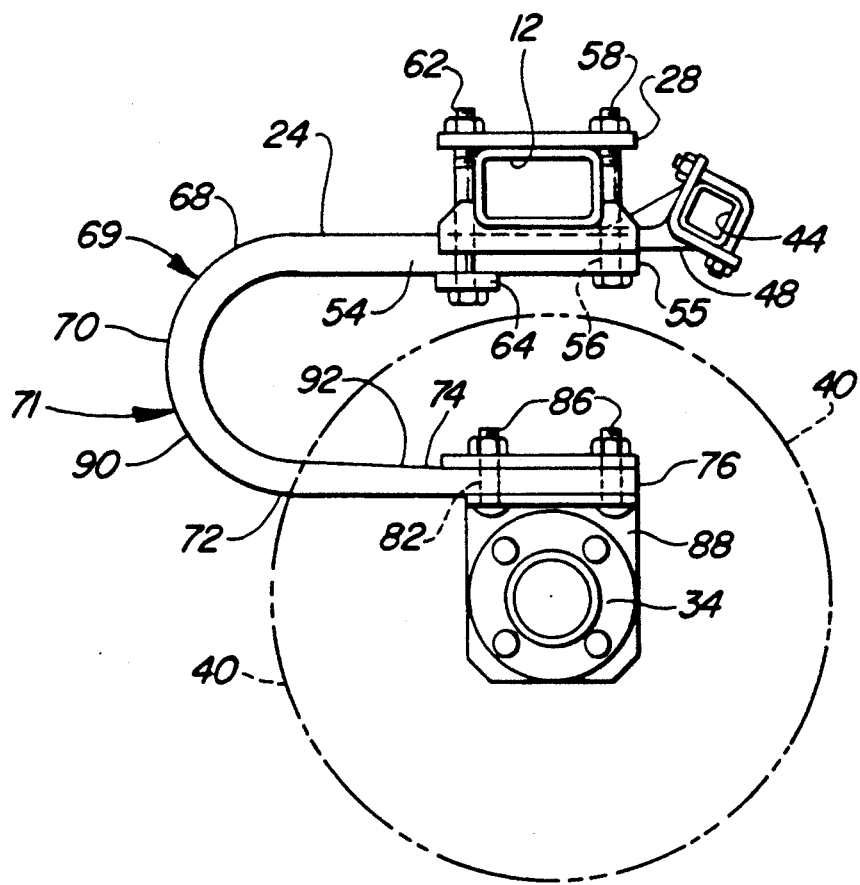
FIG. 2 is a side view of a portion of the disk gang assembly of FIG. 1 including a C-spring standard, with parts removed to better show the taper on the C-spring standard.
Figure 3:
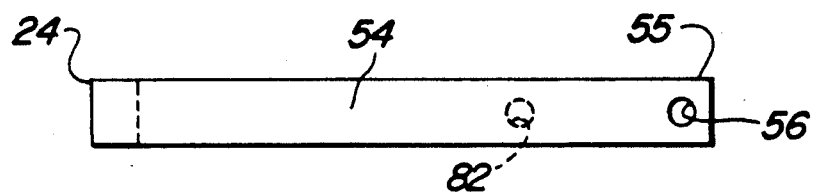
FIG. 3 is a top view of the C-spring standard of FIG. 2.

As shown in FIGS. 1 and 2, the C-spring 24 is tapered and includes an upper horizontally extending portion 54 having an aft end 55 which is apertured at 56 to receive a bolt 58 on the bracket 28. Forward bolts 62 project upwardly on either side of the spring 24 through a transverse strap 64 and through the upper portion of the bracket 28 to secure the spring to the frame 12. The spring 24 extends forwardly in a horizontal attitude from the bracket 28 to an upper bend location indicated at 68. The bent portion of the spring includes a first or upper quadrant 69 which curves downwardly from the location 68 with substantially constant radius to a forwardmost nose location 70. The constant radius curve continues through a second or lower quadrant 71 from the nose location 70 downwardly and rearwardly to a location 72, directly below the location 68, where a lower horizontal portion 74 extends rearwardly to an end 76 located directly below the aft end of the upper portion 54. Apertures 82 and 84 are punched in the portion 74, and bolts 86 extend through a bearing bracket 88 which supports the bearing 34 adjacent the end 76 (FIG. 2).

The spring 24 is of constant cross section from the upper rearward end 55 to a location, indicated at 90, in the lower quadrant 71 of the curved portion where the spring thickness begins to taper. The taper, which is substantially constant, continues from location 90 to a location 92 between the aperture 82 and location 72 at the forward end of the lower horizontal portion 74. From the location 74, the thickness remains constant. By way of example, the spring 24 has a constant cross section of 1.5 inches×2 inches from the upper aft end to the location 90, which is preferably at 45 degrees down from the nose location 70 (i.e., three-fourths of the way around the curved portion or centrally located in the lower quadrant). At location 90, the thickness of the spring begins a taper of about 0.0552 inch per inch and tapers from a starting thickness of 1.5 inch to a final thickness of 1.0 inch at the location 92. From location 92 to the end 76 the thickness is maintained constant at 1.0 inch. The location 92 is preferably several inches forward of the aperture 82. The width of the spring remains constant at 2.0 inches the entire length of the spring. The radius of the curved portion as measured to the outer or forward spring surface is preferably on the order of 5.25 inches.

Figure 4:
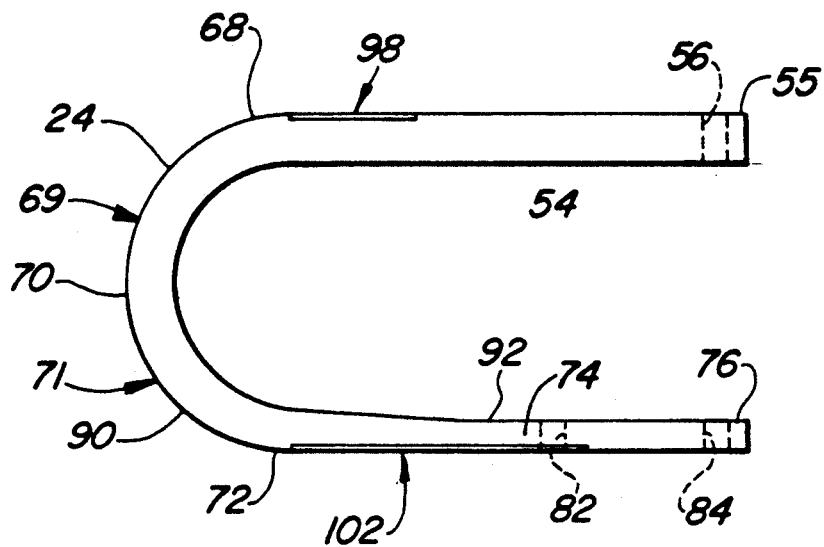
FIG. 4 is a side view of the standard of FIG. 3, with areas that are shot-peened during manufacture indicated by shading.

For maximum service life, the areas indicated at 98 and 102 must be free from nicks and die marks. These areas are shot peened for smoothness and to impart residual compressive stresses in the outer surface. The curved portion of the spring also must be free of nicks and die marks. The apertures 56, 82 and 84 are punched from the outer surface side (that is, from the side corresponding to the top of the portion 54 and bottom of the portion 74 when finally shaped as shown in FIG. 4) prior to bending to avoid weakness in the bracket areas.

Having described the preferred embodiment, it will become apparent that various modifications can be made without departing from the scope of the invention as defined in the accompanying claims.

We claim:

1. In a C-spring standard for an implement such as a disk harrow, a shank having a first straight portion extending horizontally, a curved portion including an upper quadrant extending downwardly from the first straight portion and a lower quadrant curving back in the direction of the first straight portion, and a second straight portion extending from the lower quadrant generally parallel to and below the first straight portion, the improvement comprising: the upper quadrant of the curved portion having a substantially constant cross section, and wherein the lower quadrant has a tapered cross section extending to the second straight portion.

2. The invention as set forth in claim 1 wherein the tapered cross section begins at a central location in the lower quadrant.

3. The invention as set forth in claim 1 wherein the cross section of the shank is rectangular and substantially constant from the first straight portion to the lower quadrant, and the thickness of the shank decreases by approximately one-third from the lower quadrant to the second straight portion.

4. The invention as set forth in claim 1 wherein the second straight portion includes a tapered portion extending from the lower quadrant and a non-tapered portion extending from the tapered portion.

5. The invention as set forth in claim 4 wherein the second straight portion includes an end section adapted for mounting a tool support, and wherein the end section is located in the non-tapered portion such that the tool support when mounted is offset from the location where the tapered and non-tapered portions meet.

6. In a C-spring standard for an implement such as a disk harrow, a shank having a first straight portion extending horizontally, a curved portion including an upper quadrant extending downwardly from the first straight portion and a lower quadrant curving back in the direction of the first straight portion, and a second straight portion extending from the lower quadrant below the first straight portion, the improvement comprising: the first straight portion and the upper quadrant having a substantially constant cross section, the shank including means for providing a uniform stress distribution along its length including a tapered section wherein the cross section decreases in area, the tapered section beginning in the lower quadrant and extending to the second straight portion.

7. The invention as set forth in claim 6 wherein the tapered section begins at a central location in the lower quadrant.

8. The invention as set forth in claim 7 wherein the shank tapers at a constant rate from the central location in the lower quadrant to an intermediate location in the second straight portion.

9. The invention as set forth in claim 8 wherein the second straight portion has a tool mounting end and has a constant cross section from the intermediate location to the tool mounting end.

10. The invention as set forth in claim 7 wherein the tapered portion has a constant width and decreases in thickness.

11. The invention as set forth in claim 10 wherein the thickness of the shank decreases by about one-third from the beginning of the taper to the end of the taper.

12. The invention as set forth in claim 11 wherein the second straight portion has a tool mounting end of constant cross section and the tool mounting end is offset a substantial distance from the end of the taper.

13. In a disk harrow having a disk blade gang assembly supported from a disk frame for forward movement over the soil, a disk gang support standard comprising:
    a C-spring having an upper horizontal portion with an aft end and means for mounting the aft end to the disk frame, the upper horizontal portion extending forwardly from the aft end to a curved portion having a first quadrant curved downwardly and forwardly from the upper horizontal portion to a central forwardmost nose section, the curved portion having a second quadrant bent downwardly and rearwardly from the nose section to a lower horizontal portion, the lower horizontal portion extending rearwardly from the second quadrant to a tool receiving end having a disk bearing mounted thereon;
    wherein the upper horizontal portion adjacent the first quadrant and the first quadrant have a substantially constant cross section, and the second quadrant has a cross section which tapers from the constant cross section to a smaller cross section for increased flexibility and uniform stress distribution along the length of the C-spring.

14. The invention as set forth in claim 13 wherein the cross section of the C-spring is generally rectangular and the thickness of the constant cross section is approximately two-thirds or less of the width of the constant cross section, wherein the thickness of the tapered portion of the second quadrant decreases.

15. The invention as set forth in claim 14 wherein the taper continues from the second quadrant to the forward portion of the lower horizontal portion and terminates in a cross section having a thickness approximately equal to one-half the width of the constant cross section.

16. The invention as set forth in claim 15 wherein the tool receiving end is of a constant cross section which is substantially similar to the cross section at the termination of the taper.

17. The invention as set forth in claim 16 wherein the disk bearing is offset rearwardly of the termination of the taper and is supported on the constant cross section of the tool receiving end.

18. The invention as set forth in claim 13 wherein the taper in the second quadrant begins at a location approximately 45 degrees down from forwardmost nose section.

* * * * *